C. H. PAYNE.
EDIBLE CUTTER.
APPLICATION FILED APR. 13, 1914.
1,129,223.
Patented Feb. 23, 1915.
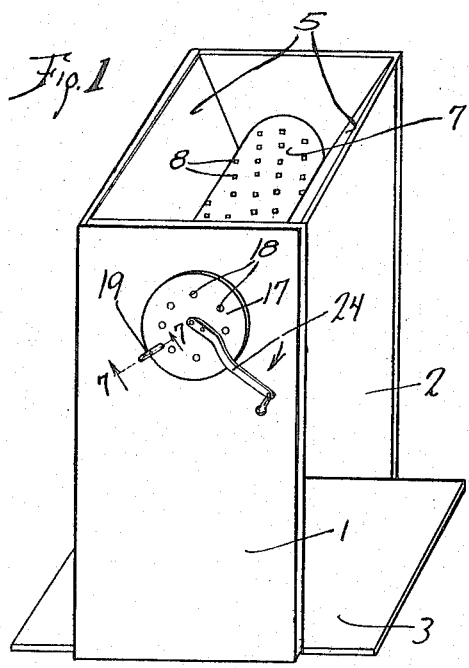
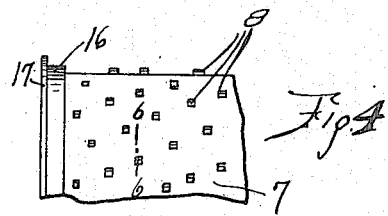
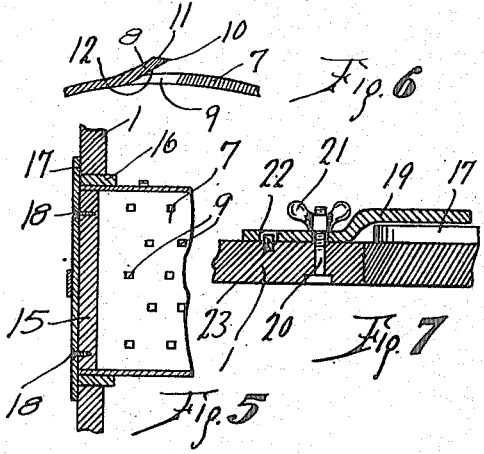
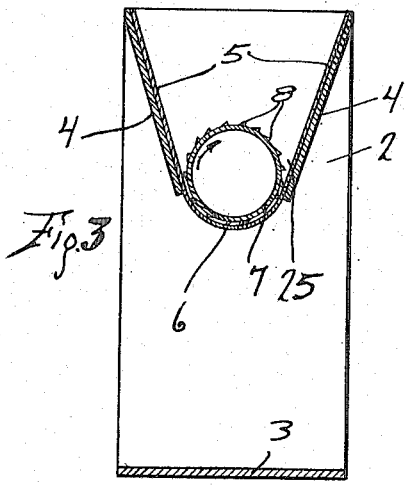
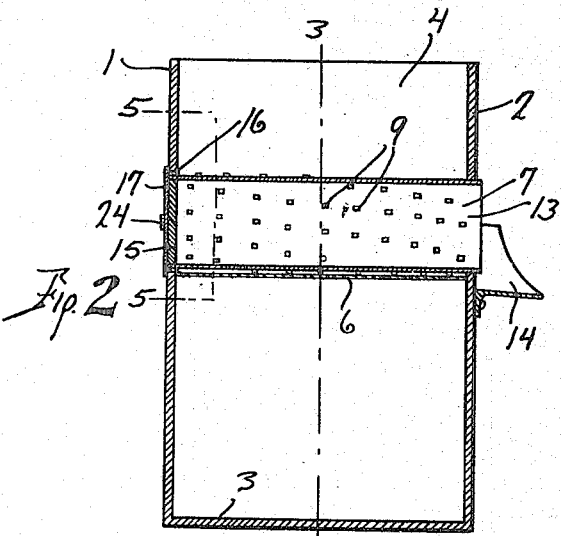
Witnesses
Harold Scantlebury
Ansley Strom
Inventor
Clarence H. Payne
By Herbert E. Smith
Attorney

UNITED STATES PATENT OFFICE.

CLARENCE H. PAYNE, OF SPOKANE, WASHINGTON.

EDIBLE-CUTTER.

1,129,223. Specification of Letters Patent. Patented Feb. 23, 1915.

Application filed April 13, 1914. Serial No. 831,523.

*To all whom it may concern:*

Be it known that I, CLARENCE H. PAYNE, a citizen of the United States, residing at Spokane, in the county of Spokane and State of Washington, have invented new and useful Improvements in Edible-Cutters, of which the following is a specification.

This invention relates to improvements in edible cutters which is especially adapted for subdividing vegetables, fruit and the like.

It is one of the features of this invention to provide a hollow movable cutter from the body of which cutting teeth are struck up in a manner to provide openings through which the cuttings may discharge into the interior of the cutter.

A further object is to provide the cutter with teeth of chisel formation so that the resulting subdivision will be in cut strips or shreds in contradistinction to torn parcels.

A further object is to dispose the teeth out of alinement so as the approach of the teeth, in following order, will be against fresh or uncut portions of the material, in other words, the teeth are arranged so that they will not track with respect to each other.

It is a further object of the invention to provide an improved form of mounting for the cutter to permit of ready insertion and withdrawal of the latter therefrom.

Further objects and features of the invention will be more fully described in connection with the accompanying drawing and will be more particularly pointed out in and by the appended claims.

In the drawings:—Figure 1 is a perspective view illustrative of one form of my invention. Fig. 2 is a vertical sectional view thereof. Fig. 3 is a sectional view on line 3—3 of Fig. 2. Fig. 4 is a fragmentary end view of a portion of the cutter. Fig. 5 is a sectional view on line 5—5 of Fig. 2. Fig. 6 is a sectional view on line 6—6 of Fig. 4. Fig. 7 is a sectional view on line 7—7 of Fig. 1.

Like characters of reference designate similar parts throughout the different figures of the drawing.

As illustrated, my invention includes bearing uprights 1 and 2 which may be connected with a floor base 3 to form a frame. Extending between the uprights 1 and 2 are hopper or trough supports 4, which extend downwardly from the upper portions of the uprights to form a part of a hopper or trough structure. I mount upon the supports a strip of sheet material 5, which extends downwardly along said supports from the upper portions thereof, as clearly shown in Fig. 3, and which also extends below and across the space between said supports, as indicated at 6, thereby forming a closed hopper or trough structure, the end walls of which are formed by the uprights 1 and 2.

I journal in the uprights 1 and 2 a cutter, indicated as a whole at 7, and shown in the form of a hollow shell of cylindrical formation. The cutter 7 is provided with teeth 8, which is shown more particularly in Fig. 6, as being struck up from the stock of the cutter 7 thereby forming openings 9 for interior discharge of cuttings into the shell. The teeth are struck up at such width that I am able to file or otherwise produce thereon a cutting edge 10 of substantially chiseled formation by filing or otherwise dressing the end 11. Thus it will be seen that the cutting edges 10 may be arranged to project in the direction of movement which may be imparted to the cutter and the ends 11 are substantially concentric with the shell. It will likewise be seen that the teeth over hang the openings 9 and the under or inner faces 12 are disposed at such an angle as to effectively deflect or guide the cuttings or shreds into the interior of the shell.

By reference to Fig. 4, it will be seen that the teeth are so disposed and arranged that a following tooth will not track its immediate preceding tooth so that I thereby cause engagement of the teeth on the edibles in such a manner that following teeth will continuously engage surfaces not engaged by the immediately preceding teeth. In the disposition shown in Fig. 4, the teeth are arranged in rows extending longitudinally of the cutter, but partially circumferentially thereof, at such a pitch as to result in the disposition hereinbefore described. To obtain the staggered order shown, I begin one row, at one end of the cutter, slightly in advance of the adjacent rows, as will be clearly noted by reference to Fig. 4.

One end of the cutter 7 is open, as at 13, and I may provide a chute 14, on the upright 2, in a manner to catch the discharge passing out the open end 13. The remaining end of the cutter is closed by a head which may be in the form of an imperforate disk 15. The open end 13 of the cutter is peripherally journaled, directly in the upright 2, and I stop the teeth short of the open end 13 so that projecting teeth will not engage the upright 2. However, the closed end of the cutter is journaled in the upright 1 by means of a bearing ring 16 which is slightly greater in thickness so as to circumferentially project radially outwardly beyond the teeth thereby permitting the cutter to be withdrawn endwise through the upright 1. The bearing ring 16 may be fixed upon the cutter in any desired manner.

I provide improved means for rotatively retaining the cutter in the uprights 1 and 2 against longitudinal displacement.

As shown, such means includes a retaining disk 17 which may be fixed to the head disk 15 by screws 18. The retaining disk 17 projects beyond the bearing ring 16 so as to engage the outer face of the upright 1 and prevent longitudinal displacement of the cutter to the right of Fig. 2. Said retaining means may also include a retainer member 19 which overhangs the disk 17, and which may be secured to the upright 1 by bolt 20 having a winged nut 21. In order to hold the retaining bar or member against rotative displacement about the bolt 20, I provide said member with an opening 22 adapted to fit over a projecting stud 23. It will be seen that when the nut 21 is turned home on the retaining member the latter will be held in such a position as to prevent shifting of the cutter to the left of Fig. 2 although I provide sufficient clearance to prevent binding.

A crank or like operating member 24 may be fixed to the cutter so as to impart rotation thereto.

The edibles to be subdivided are placed in the hopper or trough structure above the cutter and their weight will form or provide a feed of sufficient force to effect engagement by the teeth. The direction of rotation is indicated by the arrows and the principal cutting zone will be at the angle 25, but the weight of the edibles will also effect slight shredding action of shallower cuts, rearwardly in respect to angle 25, as regards the direction of rotation. As the teeth advance beyond the angle 25, the deflecting portions 12 will engage smaller particles which may lie between the cutter and the closed portions 6 of the trough so as to work all of the subdivided material into the interior of the shell or cutter.

The device of my invention is especially adapted for cutting chicken feed, but may of course be made in different sizes and adapted for particular and other utilities.

It is believed that the device of my invention will be fully understood from the foregoing discription, and while I have herein shown and described one specific form of my invention I do not wish to be limited thereto except for such limitations as the claims may import.

I claim:—

In an edible cutter, a cylinder structure provided with cutter teeth, a bearing ring surrounding one portion of said structure and projecting radially beyond said teeth, a bearing in which said ring is journaled to rotatively mount said cutter structure and permit withdrawal of said cutter structure endwise through said bearing with the cutter teeth free from engagement with said bearing, a retaining disk fixed to said cutter structure and projecting radially therefrom in overlapping engagement against said bearing to prevent longitudinal movement of said cutter structure in one direction, and a bar-like retaining member mounted on said bearing and disposed in overlapping radial relation against said retaining disk to prevent longitudinal movement of said cutter structure in a direction opposite to that in which said disk prevents said cutter from moving, substantially as described.

In testimony that I claim the foregoing as my own I hereby affix my signature in the presence of two subscribing witnesses.

CLARENCE H. PAYNE.

Witnesses:
 HAROLD SCANTLEBURY,
 EDNA BROYLES.

Copies of this patent may be obtained for five cents each, by addressing the "Commissioner of Patents, Washington, D. C."